United States Patent

[11] 3,609,214

[72] Inventor Tadao Totsuka
9, 35, 2-Chome Johoku Hamamat-su, Shizuoka-ken, Japan
[21] Appl. No. 820,503
[22] Filed Apr. 30, 1969
[45] Patented Sept. 28, 1971
[32] Priority July 26, 1968
[33] Japan
[31] 43/63547

[54] CORD HOLDER
10 Claims, 4 Drawing Figs.
[52] U.S. Cl. .................................................. 174/65 R, 339/103 C, 174/135
[51] Int. Cl. .................................................. H01r 13/58
[50] Field of Search ........................................ 339/103–107, 101, 102, 60, 89, 94; 287/110, 111; 24/280; 285/177, 4; 174/65, 135, 151

[56] References Cited
UNITED STATES PATENTS
| 1,456,178 | 5/1923 | Crockett | 339/103 X |
| 2,708,714 | 5/1955 | Stevens, Jr. | 339/101 X |
| 2,978,533 | 4/1961 | Colbert | 174/93 |

FOREIGN PATENTS
| 18,375 | 9/1905 | Great Britain | 285/177 |

Primary Examiner—Richard E. Moore
Attorney—Irving M. Weiner

ABSTRACT: A cord holder having a rigid annular member adapted to be attached to the casing of an electric appliance and a deformable insulation hollow insulation member fitted in the annular member. The hollow member includes a plurality of sections having different diameters for receiving electric cords having different diameters and provided with integral tightening pieces surrounding the outer periphery of said sections and adapted to receive tightening bolts.

PATENTED SEP 28 1971　　3,609,214

3,609,214

CORD HOLDER

BACKGROUND OF THE INVENTION

For the protection of an electric cord at and/or in the vicinity of an opening in an electric appliance and the like where the cord is pulled out of the appliance a rubber ring has been inserted in the appliance opening and the cord has been pulled out of the appliance through the ring. Alternatively, a metallic connector has been fixedly attached to the appliance at and/or in the vicinity of the opening. However, the conventional rubber ring for the purpose has the disadvantage that it is frequently difficult to be satisfactorily attached to the electric appliance and comes off the appliance while the electric cord is being manipulated in an operation. Such a rubber ring frequently fails to serve its intended purpose, such as the protection of the electric cord from any possible damage which may be inflicted on the cord because of its frictional contact with a part of the appliance being employed. And the conventional metallic connector also has the grave disadvantage that it has a rather complicated construction and a rather heavy weight because of the metal of which the connector is formed. Furthermore, each of the conventional rubber ring and metallic connector can be employed for an electric cord having only a specific predetermined diameter. Accordingly, different types or diameters of rubber rings and metallic connectors have to be provided for electric cords having different diameters.

SUMMARY OF THE INVENTION

The present invention provides a cord holder which can be employed for electric cords having various different diameters and which can effectively protect a portion of an electric cord at and/or in the vicinity of an opening of an electric appliance and the like through which the cord emerges from the appliance. The cord may be protected from any possible damage which may otherwise be inflicted on the outer surface of the cord as a result of its frictional contact with the opening when the cord is pulled out of the appliance and/or manipulated in an operation.

The present invention provides a novel and improved cord holder which can effectively eliminate the disadvantages inherent in the conventional cord holders.

The present invention provides a novel and improved cord holder which comprises relatively small number of component parts and, accordingly, is simple and compact in design.

The present invention provides a novel and improved cord holder which can be economically constructed and, accordingly, is less expensive.

The present invention provides a novel and improved cord holder which can be made adaptable for holding electric cords having various the diameters by simply cutting off a portion of one component part of the holder.

The present invention provides a novel and improved cord holder which can accommodate the flexing movement of an electric cord as the cord is manipulated in an operation thereby to protect the cord from any damage which may be otherwise inflicted on the cord as the same flexes in use.

According to the present invention, there is provided a cord holder comprising a rigid annular member provided with means adapted to be attached to the casing of an electric appliance and the like and a deformable insulation hollow member tightly fitted in said annular member and having a stepped taper configuration portion which comprises a plurality of sections having different diameters for selectively receiving and holding electric cord having different diameter ranges therein, said plurality of sections being provided with integral tightening pieces surrounding them and receiving tightening bolts.

BRIEF DESCRIPTION OF THE DRAWINGS

The accompanying drawings show one preferred form of cord holder constructed in accordance with the present invention for illustration purpose only, but not for limiting the scope of the invention wherein.

DESCRIPTION OF A PREFERRED EMBODIMENT

Figure 1:
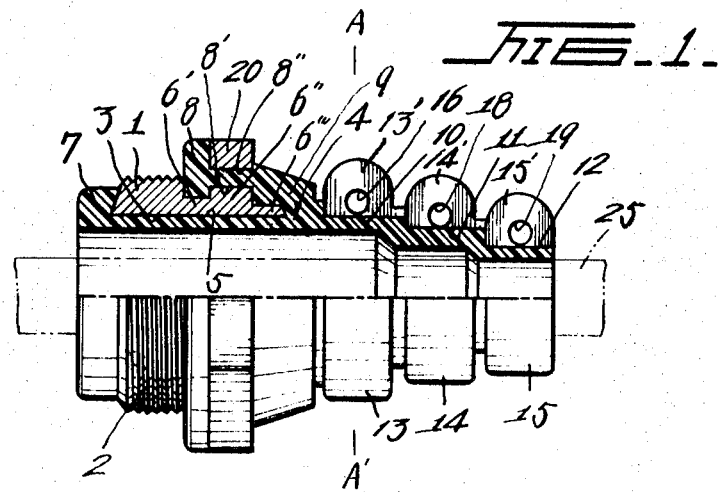
FIG. 1 is a side elevational view in partial section of said cord holder taken along substantially the longitudinal axis thereof.
Figures 2, 3:
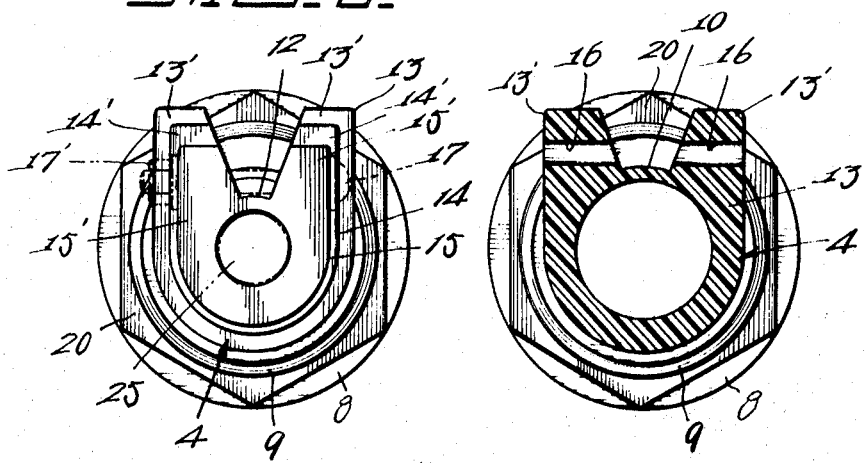
FIG. 2 is an end elevational view of said cord holder.
FIG. 3 is a cross-sectional view taken along substantially the line A—A' of FIG. 1.
Figure 4:
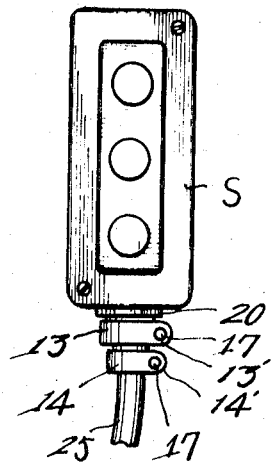
FIG. 4 is a plan view of a reduced scale which shows when said cord holder is attached to a switch for protecting an electric cord which extends from the switch.

The present invention will be now described referring to the accompanying drawings in which one preferred form of cord holder according to the present invention is illustrated. The cord holder generally comprises a rigid annular member 1 formed of metal or a hard synthetic resin and having a threaded portion 2 on the outer periphery at one end of the member adapted to be threaded into a mating threaded opening (not shown) of an electric appliance S (see FIG. 4) and a deformable insulation hollow member 4 formed of rubber and the like material and having an annular recess 5 on the outer periphery which fits in the center opening 3 of the annular member 1 and extends a distance between the opposite ends of the member 4. The diameter of the other or nonthreaded portion or end of the outer periphery of the annular member 1 is smaller than that of the threaded portion 2 and the nonthreaded end includes an intermediate diameter first section 6' adjacent to the threaded portion 2 at the inner end of the latter, a largest diameter section 6'' adjacent to the end of the intermediate diameter section 6' remote from the threaded portion 2 and a smallest diameter section 6''' adjacent to the end of the largest diameter section 6'' remote from the intermediate diameter section 6' where one or the inner end of the recess 5 terminates. The deformable insulation hollow member 4 has an abutment 7 at one end (the left end as seen in FIG. 1) at the inner end face of which the other end of the annular recess 5 terminates and against which the adjacent end of threaded portion 2 of the annular member 1 abuts. The deformable insulation hollow member 4 is in a tubular form and is further provided with an annular flanged or largest diameter portion disposed peripherally spaced out of the annular recess 5 covering a distance between the opposite ends of the recess and having an inner annular recess 8' for snugly receiving the largest diameter section 6'' of the annular member 1 and an outer annular recess 8'' in diametric opposition to the inner annular recess 8' for snugly receiving an annular tightening member 20 which firmly holds the hollow member flanged portion 8 against the annular member 1. The rest portion of the portion adjacent to the end of the flanged portion 8 remote from the abutment 7 has a particular tapered configuration with a plurality of stepped sections 9, 10, 11 and 12 which have gradually reduced diameters in the order stated, i.e., the first section 9 has the largest outer and inner diameters, and the fourth section 12 has the smallest outer and inner diameters. The first section 9 has a frustoconical configuration. The above-mentioned one end of the annular recess 5 extends into the frustoconical first section 9. The above-mentioned smallest diameter section 6''' of the nonthreaded portion of the annular member 1 is fitted in the frustoconical first section 9. The second section 10 has an outer diameter smaller than that of the first section 9. The inner periphery of the second section 10 includes a portion having the same inner diameter as that of the first section 9 and an outwardly tapered portion. Similarly, the outer diameter of the third section 11 is smaller than that of the second section 10, and the inner periphery of the third section 11 includes a portion having a constant inner diameter smaller than that of the second section 10 and an outwardly tapered portion. The fourth section 12 has outer and inner diameters smaller than those of the third section 11. The second, third and fourth sections 10, 11 and 12 have U-shaped tightening pieces 13, 14 and 15 integrally formed therewith, respectively, and these U-shaped tightening pieces surround the associated sections 10, 11 and 12 respectively. The opposite legs 13' of the U-shaped tightening piece 13 have aligned bores 16 for receiving a tightening bolt 17. Similarly, the opposite legs 14' and 15' of the U-shaped tightening pieces 14 and 15 respectively, are also provided with aligned bores 18 and 19, respectively, for receiving tightening bolts 17, respectively (the bolts for the tightening pieces 14 and 15 are not shown). After having been inserted through the aligned bores 16 in the opposite legs 13' of the tightening piece 13, a nut 17' is threaded on the threaded end of the bolt 17 and the bolt is tightened, thereby to tighten the associated second section 10 against an electric cord 25 in the manner as will be mentioned hereinafter. Although not shown, similarly, the bolts 17 inserted in the bores 18 and 19 in the opposite legs 14' and 15' of the U-shaped tightening pieces 14 and 15 are tightened by nuts (not shown) threaded thereon, thereby to tighten the respectively associated sections 11 and 12 against the electric cord 25 in the same manner as in the case of the second section 10.

In use, in the first place, the annular member 1 of the electric cord holder by the present invention is attached to the switchbox S of an electric appliance, for example, by means of the threaded portion 2 on the outer periphery of the annular member 1 and a mating threaded opening (not shown) provided in the switchbox S through which an exposed portion of the electric cord 25 extends. Thus, the extension of the electric cord 25 is passed through the deformable insulation hollow member 4. As mentioned above, the novel cord holder is adapted to receive electric cords having different diameters. If the electric cord 25 has a diameter larger than the inner diameter of the smallest diameter fourth section 12, but smaller than the inner diameter of the adjacent third section 11, for example, the smallest diameter section 12 is cut off together with the associated tightening piece 15, by any conventional cutting means (not shown), so the cord 25 may be passed through the remaining portion of the deformable insulation hollow member 4. Thereafter, the bolt 17 extending through the bores 18 in the legs 14 of the third section 11 is tightened, thereby to tighten the third section against the cord to firmly hold the cord 25 in position. Similarly, if the diameter of the cord 25 is larger than the inner diameter of the third section 11, but smaller than that of the second section 10, the third section 11 is cut off together with the associated tightening piece 14, by conventional cutting means, so the cord 25 may be passed through the remaining portion of the hollow member 4 with the fourth and third sections and their associated tightening pieces removed therefrom. Thereafter, the bolt 17 extending through the aligned bores 16 in the legs 13' of the second section 10 is tightened, thereby to tighten the second section 10 against the cord 25 to hold the cord in position.

Although only four different diameter sections 9, 10, 11 and 14 are provided in the illustrated embodiment, it will be understood that the number of such sections may be increased or decreased as desired.

Thus, it will be understood that the novel cord holder can be conveniently and selectively employed for electric cords having different diameters. In addition, the novel cord holder serves to effectively protect the electric cord at and/or in the vicinity of the opening of the switchbox of an electric appliance where the cord emerges from the switchbox against possible damage as a result of its frictional contact with the adjacent part of the appliance in use. Even if the electric cord 25 flexes, the insulation hollow member 4 can also flex or deform in response to the flexing movement of the cord by virtue of the flexibility of the material of which the hollow member 4 is formed, whereby the cord may satisfactorily sustain any stress which may be applied thereon when the cord is pulled out with a substantially great force without being damaged.

What is claimed is:

1. A cord holder comprising in combination:

a rigid annular member provided with means adapted to be attached to the casing of an electric appliance;

a deformable insulation hollow member tightly fitted in said annular member and at one end having a stepped taper configuration portion;

said stepped taper configuration portion including a plurality of sections having different inner diameters for selectively receiving and holding therein electric cords having different diameter ranges; and said plurality of sections being provided with integral tightening pieces surrounding them and receiving tightening bolts.

2. A cord holder as set forth in claim 1 in which said means adapted to be attached to the casing of said electric appliance comprises threads provided on the outer periphery of said annular member at one end of the latter.

3. A cord holder as set forth in claim 1, in which said deformable insulation hollow member has a tubular configuration and is further provided with an integral abutment at one end adapted to abut against the adjacent end of said annular member, an integral flanged portion positioned between the opposite ends of the hollow member, and an integral frustoconical portion continuous to said flanged portion at the end of the flanged portion remote from said abutment, said abutment and flanged portion defining an annular recess therebetween for receiving said annular member.

4. A cord holder as set forth in claim 3, in which said stepped taper configuration portion of the deformable insulation hollow member is continuous to said frustoconical portion at the end of the frustoconical remote from said flanged portion and gradually reduces its diameter from the end of the frustoconical portion remote from the flanged portion toward said one end of the deformable insulation hollow member with the section adjacent to said frustoconical portion having the largest diameter and the section at said one end of the hollow member having the smallest diameter.

5. A cord holder as set forth in claim 1, in which each of said sections of the stepped taper configuration portion has substantially a U-shaped tightening piece including two opposite legs provided with aligned bores for receiving said tightening bolts.

6. A cord holder as set forth in claim 1, in which said stepped taper configuration portion of the deformable hollow member is so arranged that the largest diameter section is positioned at the innermost end, and the smallest diameter section is positioned at the outermost end.

7. A cord holder as set forth in claims 3, in which said means adapted to be attached to the casing of said electric appliance comprises threads provided on the outer periphery of said annular member at one end of the latter.

8. A cord holder as set forth in claim 7, in which said stepped taper configuration portion of the deformable insulation hollow member is continuous to said frustoconical portion at the end of the frustoconical remote from said flanged portion and gradually reduces its diameter from the end of the frustoconical portion remote from the flanged portion toward said one end of the deformable insulation hollow member with the section adjacent to said frustoconical portion having the largest diameter and the section at said one end of the hollow member having the smallest diameter.

9. A cord holder as set forth in claim 2, in which each of said sections of the stepped taper configuration portion has substantially a U-shaped tightening piece including two opposite legs provided with aligned bores for receiving said tightening bolts.

10. A cord holder as set forth in claim 2, in which said stepped taper configuration portion of the deformable hollow member is so arranged that the largest diameter section is positioned at the innermost end, and the smallest diameter section is positioned at the outermost end.